(12) United States Patent
Pike et al.

(10) Patent No.: US 8,557,053 B2
(45) Date of Patent: Oct. 15, 2013

(54) ACTUATOR ASSEMBLY AND ASSOCIATED APPARATUSES

(75) Inventors: Michael Bryan Pike, Kinston, NC (US); Fred Dennis Kedjierski, Oriental, NC (US)

(73) Assignee: Electrolux Home Products, Inc., Charlotte, NC (US)

( * ) Notice: Subject to any disclaimer, the term of this patent is extended or adjusted under 35 U.S.C. 154(b) by 732 days.

(21) Appl. No.: 12/625,768

(22) Filed: Nov. 25, 2009

(65) Prior Publication Data

US 2010/0126166 A1  May 27, 2010

Related U.S. Application Data

(60) Provisional application No. 61/118,240, filed on Nov. 26, 2008.

(51) Int. Cl.
*B08B 3/00* (2006.01)

(52) U.S. Cl.
USPC .............. 134/57 D; 134/56 D; 134/58 D

(58) Field of Classification Search
USPC .................. 134/56 D, 57 D, 58 D
See application file for complete search history.

(56) References Cited

U.S. PATENT DOCUMENTS

| | | | |
|---|---|---|---|
| 3,178,915 A | 4/1965 | Hertel | |
| 6,058,946 A | 5/2000 | Bellati et al. | |
| 6,464,200 B1 | 10/2002 | Hines et al. | |
| 7,162,896 B2 | 1/2007 | Eiermann et al. | |
| 7,182,101 B2 * | 2/2007 | Alacqua et al. | 137/875 |
| 7,210,315 B2 | 5/2007 | Castelli et al. | |
| 7,270,135 B2 * | 9/2007 | Virgilio et al. | 134/93 |
| 7,395,825 B2 | 7/2008 | Dirnberger et al. | |
| 2007/0107753 A1 | 5/2007 | Jerg | |
| 2007/0295360 A1 | 12/2007 | Jerg et al. | |
| 2007/0295370 A1 | 12/2007 | Jerg et al. | |
| 2008/0047620 A1 | 2/2008 | Jerg | |
| 2008/0053494 A1 | 3/2008 | Moro et al. | |
| 2008/0178526 A1 | 7/2008 | Browne et al. | |
| 2008/0295875 A1 | 12/2008 | Jerg et al. | |
| 2009/0056760 A1 | 3/2009 | Kessler et al. | |
| 2009/0235963 A1 | 9/2009 | Classen et al. | |

FOREIGN PATENT DOCUMENTS

| | | |
|---|---|---|
| DE | 72 41 619 U | 5/1973 |
| DE | 72 41 635 U | 5/1973 |
| DE | 29 37 589 A1 | 4/1981 |
| DE | 40 12 579 A1 | 10/1991 |
| DE | 198 22 735 A1 | 11/1999 |
| DE | 199 47 324 A1 | 4/2001 |
| DE | 101 59 410 A1 | 6/2003 |
| DE | 102006053147 A1 * | 5/2007 |

(Continued)

*Primary Examiner* — Joseph L Perrin
*Assistant Examiner* — Charles W Kling
(74) *Attorney, Agent, or Firm* — Alston & Bird LLP

(57) ABSTRACT

An actuator assembly, adapted to move a movable member between a first position and a second position, is provided. Such an actuator assembly comprises an actuator device configured to selectively provide an actuation signal, and an actuatable member operably engaged with the actuator device. The actuator member is operably engaged with a fixed member and extends therefrom into communication with the movable member. The actuatable member is further configured to receive the actuation signal and to change in dimension in response thereto, so as to provide a linear force for moving the movable member, with respect to the fixed member, between the first and second positions. Associated apparatuses are also provided.

17 Claims, 7 Drawing Sheets

(56) References Cited

FOREIGN PATENT DOCUMENTS

| | | |
|---|---|---|
| DE | 10 2006 019603 A1 | 10/2007 |
| DE | 10 2006 043919 A1 | 3/2008 |
| DE | 10 2006 061 150 A1 | 6/2008 |
| DE | 10 2007 010 772 A1 | 9/2008 |
| GB | 985545 A | 3/1965 |
| GB | 1071732 A | 6/1967 |
| KR | 2001-0036195 A | 5/2001 |
| KR | 2006-0104609 A | 10/2006 |
| WO | WO 2008/122450 A1 | 10/2008 |

\* cited by examiner

ACTUATOR ASSEMBLY AND ASSOCIATED APPARATUSES

CROSS-REFERENCE TO RELATED APPLICATION(S)

This application claims the benefit of U.S. Provisional Patent Application Ser. No. 61/118,240 filed Nov. 26, 2008, the entirety of which is incorporated herein by reference.

BACKGROUND OF THE DISCLOSURE

1. Field of the Disclosure

Aspects of the present disclosure are directed to an actuator assembly and, more particularly, to an actuator assembly and associated apparatuses implementing an actuatable member configured to change in dimension in response to an actuation signal so as to provide a linear actuation.

2. Description of Related Art

Once a dishwasher has completed a wash/rinse portion of a dish cleaning cycle, the user may be able to optionally select that the dishwasher actively dry the dishware before the dish cleaning cycle is completed. In this manner, the user may desire that the dishware be substantially dry prior to removal thereof from the dishwasher. In order to accomplish such active drying, the dishwasher may include a provision for air circulation within the tub portion, wherein the circulated air may be from within the tub portion, outside the tub portion, or a combination of both. In accomplishing such air circulation, some dishwasher may include a fan, which is normally off during the washing/rinsing portion of the dish cleaning cycle, in combination with a damper in communication between the interior of the tub portion and the exterior of the dishwasher. The damper is normally closed during the washing/rinsing portion of the dish cleaning cycle. Once the washing/rinsing portion of the dish cleaning cycle is completed (and the active drying option is selected), an actuator, such as a solenoid linked to the damper, is actuated to move the damper to an open position. With the damper in the open position, outside air may be allowed to enter the tub portion of the dishwasher. After the damper is opened (and/or detected to be in the open position), the fan is actuated to pull air through the open damper from outside the dishwasher and to circulate the air into the tub portion and about the dishware to facilitate drying of such dishware. De-actuation of the actuator, following de-actuation of the fan, returns the damper to the normally-closed position.

However, in such a configuration, the solenoid (actuator) used to open the damper may, in some instances, experience or cause a power surge upon actuation by an electrical source. In some configurations, the electrical source may be a 12 volt electrical source, since a component (i.e., solenoid) having such a relatively lower voltage input may not require, for example, expensive safety verifications and/or certifications often involved with a component having a relatively higher voltage input (i.e., 120 VAC). One shortcoming with such a configuration, though, is that a power surge may sometimes be associated with the actuation of a 12 volt solenoid, wherein such a power surge may undesirably cause a transient that may be difficult to filter out of the low voltage electrical system. Another shortcoming may be that, since the solenoid may be required to remain actuated to, for example, keep the damper in the open position during the drying procedure, the continuously actuated solenoid (actuator) may undesirably consume excessive power. Yet another shortcoming may be that, since the solenoid may be configured to produce a magnetic field for moving a plunger, and since the generated magnetic field produced by an actuated solenoid may, in turn, cause a relatively rapid movement of the plunger, contact between the plunger and a mechanical stop for limiting travel of the actuated plunger, may undesirably cause significant or otherwise noticeable noise.

In the alternative, the actuator may, in some instances, comprise a wax motor for providing the desired component movement (i.e., moving the damper to the open position). Such a wax motor may include three principal components: 1) a block of wax; 2) a plunger bearing on the wax; and 3) a heat source (i.e., a PTC thermistor) for heating the wax. When the heat source associated with the wax motor is actuated, the wax block is heated and expands. In so expanding, the expanding wax drives the plunger outwardly therefrom and, as such, may provide a linear force/motion for moving a mechanical component engaged with the plunger. Conversely, when the heat source is de-actuated, the wax block cools and contracts and the plunger is accordingly withdrawn. In some instances, withdrawal of the plunger may be facilitated by a biasing force externally applied to plunger or applied from within the wax motor. Depending on some factors such as, for example, the particular application of the wax motor, the plunger implemented by a wax motor may be characterized by a smooth and controlled (i.e., damped) motion, and thus less operational noise as compared to a magnetic solenoid. However, such wax motors may sometimes be unreliable in the field or otherwise have a limited service life.

Further, some dishwashers may include more than one operational component implementing or otherwise requiring linear actuation, wherein such linear actuation may be provided by an appropriate magnetic solenoid and/or a wax motor. Such operational components may include, for example, the actuatable fan damper, an actuatable water valve, an actuatable detergent dispenser, and an actuatable vent device. However, the use of multiple linear actuators, whether magnetic solenoids or wax motors, may undesirably add, for example, cost, higher power consumption, unreliability, and noise to the dishwasher itself.

As such, there exists a need for an actuator device for reducing, for example, cost, power consumption, unreliability, and noise, in a dishwashing appliance, as an alternative to magnetic solenoids and wax motors that may be implemented in such applications.

BRIEF SUMMARY OF THE DISCLOSURE

The above and other needs are met by aspects of the present disclosure which, according to one aspect, provides an actuator assembly adapted to move a movable member between a first position and a second position. Such an actuator assembly comprises an actuator device configured to selectively provide an actuation signal, and an actuatable member operably engaged with the actuator device. The actuator member is operably engaged with a fixed member and extends therefrom into communication with the movable member. The actuatable member is configured to receive the actuation signal and to change in dimension in response thereto, so as to provide a linear force with respect to the actuator device for moving the movable member, with respect to the fixed member, between the first and second positions.

Another aspect of the present disclosure provides an actuatable apparatus for a dishwashing appliance. Such an actuatable apparatus comprises a movable member configured to be movable between a first position and a second position. An actuator device is configured to selectively provide an actuation signal. An actuatable member is operably engaged with the fixed member and extends therefrom into communication with the movable member. The actuatable member is configured to receive the actuation signal, and to change in dimension in response thereto, so as to provide a linear force for moving the movable member, with respect to the fixed member, between the first and second positions.

Yet another aspect of the present disclosure provides a dishwashing appliance, comprising a tub portion defining a forward access opening, and a door assembly pivotably engaged with the tub portion and movable between an open position and a closed position, wherein the door assembly in the closed position cooperates with the tub portion to cover the forward access opening, and wherein the door assembly defines an upper end opposed to a lower end with respect to the forward access opening. At least one actuatable apparatus is associated with one of the tub portion and the door assembly, wherein each actuatable apparatus comprises a movable member configured to be movable between a first position and a second position, and an actuator device configured to selectively provide an actuation signal. An actuatable member is operably engaged with a fixed member and extends therefrom into communication with the movable member. The actuatable member is configured to receive the actuation signal, and to change in dimension in response thereto, so as to provide a linear force for moving the movable member, with respect to the fixed member, between the first and second positions. In some aspects, the at least one actuatable apparatus may be selected from the group consisting of an actuatable fan damper, an actuatable water valve, an actuatable detergent dispenser, and an actuatable vent device.

Aspects of the present disclosure thus provide these and other advantages as further detailed herein.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DISCLOSURE

The present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

Figure 1:
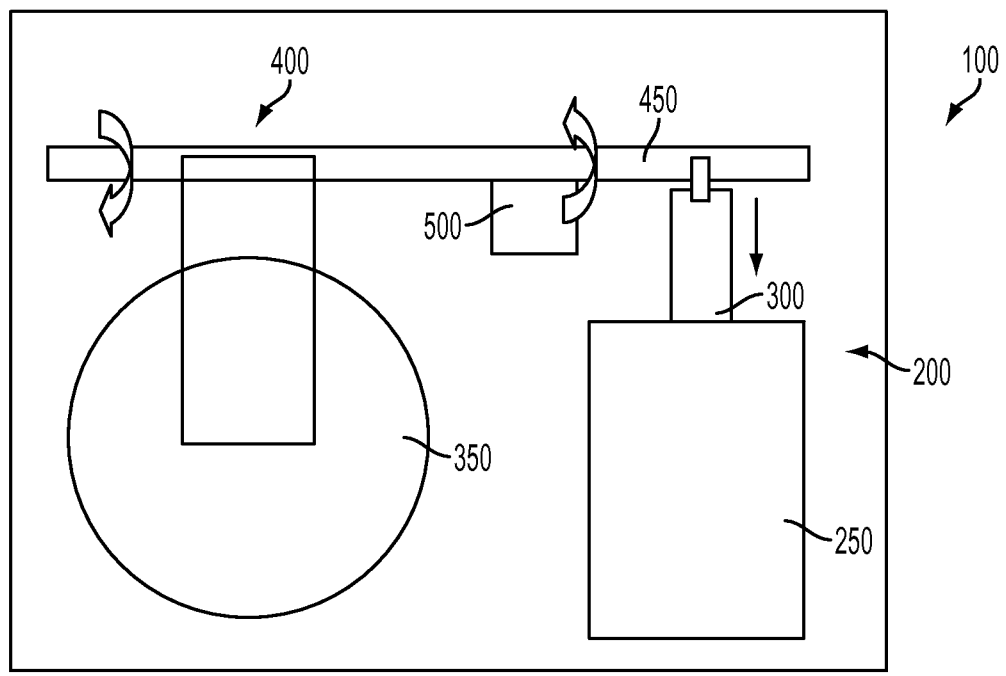
FIGS. 1 and 2A illustrate examples of a prior art actuatable apparatus comprising a fan damper.
Figure 2B:
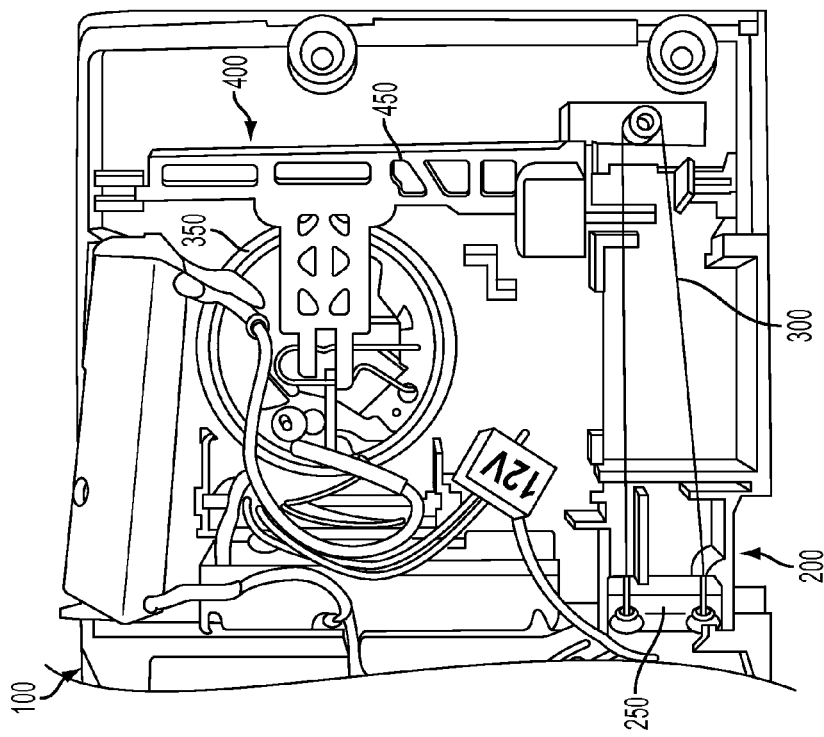
FIG. 2B illustrates an actuatable apparatus comprising a fan damper, according to one aspect of the present disclosure.
Figure 2A:
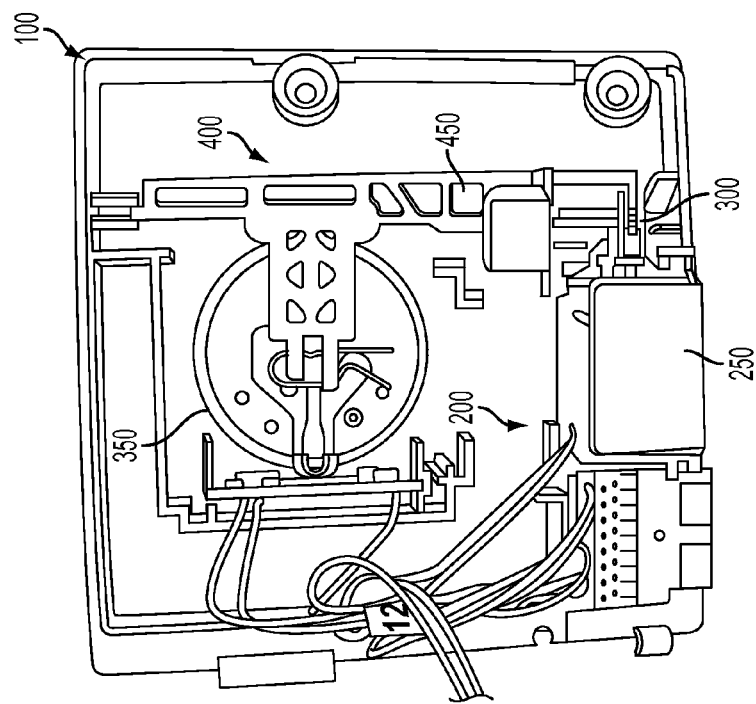

FIGS. 1 and 2A illustrate one prior art actuatable apparatus implementing an actuator assembly. In this instance, the actuatable apparatus is indicated by the element 100 and the actuator assembly indicated by the element 200. For example, such an actuatable apparatus 100 may be implemented in conjunction with a fan damper assembly used for air circulation/drying purposes in a dishwashing appliance. As illustrated, the actuator assembly 200 may include an actuator device 250 (i.e., an electrically-actuated solenoid) configured to selectively move an actuatable member 300 so as to, in turn, move a movable member 350 (in this example, a fan damper) between a closed position and an open position. In doing so, the actuatable member 300 is in communication with the movable member 350 via a linkage assembly 400 which may comprise, for example, a hinge member 450 rotatable about an axis extending perpendicularly to the axis of the actuatable member 300. Further, in this instance, the movable member 350 is disposed on the same side of the axis of the hinge member 450 as the actuator device 250, and the actuator device 250, when actuated, is configured to retract the movable member 350 with respect thereto. As such, when the actuator device 250 is actuated, the actuator device 250 retracts the movable member 250 which, in turn, rotates the hinge member 450 counterclockwise about the axis thereof. The hinge member 450 is responsive to the hinge member 450 to exert a force on the movable member 350 (damper), so as to move the damper into the plane of the illustration to an open position.

In some instances, the actuator device 250 must remain actuated (i.e., energized by an electrical source (not shown)) to maintain the movable member 350 in the open position. Upon de-actuation of the actuator device 250, the movable member 350 may be returned to the normally-closed position by a biasing device 500 operably engaged therewith. In the illustrated aspect, the biasing device 500 is operably engaged with the hinge member 450 for exerting a rotational force on the hinge member 450 in the clockwise direction (i.e., a "closing" force) for directing the movable member 350 to the closed position. One skilled in the art will appreciate, however, that such a biasing device 500 may be implemented in many different manners such as, for example, engaged with the movable member 350 and/or the actuatable member 300 and/or the actuator device 250, as necessary or desirable. In addition, one skilled in the art will appreciate that the actuator device 250 may be configured, upon de-actuation thereof, to return the movable member 350 to the normally-closed position, without the need for a biasing device 500.

One skilled in the art will also appreciate that, as shown and disclosed herein, one simple form of an actuator assembly involves an actuator device configured to move an actuatable member associated therewith in a linear manner (i.e., along the axis defined by the actuatable member) upon actuation of the actuator device, wherein such linear actuation of the actuatable member is capable of imparting a force and a displacement with respect to the actuator device. As such, in order to accomplish the desired function of the actuatable apparatus 100, the linear actuation of the actuatable member 300 may be transformed or otherwise utilized in the desired manner (direction, etc.) using an appropriate linkage assembly 400 for directing the available force and displacement, as appropriate.

However, as previously discussed, one concern with an actuatable apparatus 100 employing a solenoid as the actuator assembly 200 is that a solenoid, upon actuation, may generate a significant power transient that may be difficult to filter out of the associated low voltage circuit(s). In addition, a solenoid may also require a relatively large amount of power/energy to be actuated, and to remain actuated. Further, because of the semi-mechanical nature of such a solenoid, the initial actuation thereof may undesirably result in noise caused by the movement (and subsequent limiting of that motion, for example, by a mechanical stop) of the actuatable member 300, which may be manifest, for instance, by a "clicking" sound upon initial actuation.

Accordingly, as shown in FIG. 2B, aspects of the present disclosure provide an improved actuator assembly 200 capable of being substituted for prior art existing actuator assemblies, such as, for example, solenoids and wax motors, in an actuatable apparatus 100. In such instances, the actuatable member 300 may comprise, for example, of an appropriately configured shape memory material such as, for instance, a nickel-titanium alloy such as nitinol. In some instances, a nickel-titanium alloy such as nitinol may also be known for its superelastic properties. Nitinol may be commercially available, for example, under the trade name Flexinol®, manufactured by Dynalloy, Inc., though one skilled in the art will appreciate that nitinol is but one example of an appropriate shape memory material that may be implemented within the scope of the present application, and is not intended to be limiting in any manner with respect thereto. One characteristic of such a shape memory material is that the "actuatable member" comprised thereof may change in dimension (i.e., expand/contract) by a certain percentage (i.e., about 4%) of the original dimension(s) upon the application of a certain amount of heat thereto. Due to, for example, the metallic nature of the nitinol shape memory material, the application of the necessary amount of heat thereto may be provided, for instance, by directing an electrical current therethrough. That is, the ohmic resistance of the shape memory material to the electrical current passing therethrough, in such instances, particularly when the shape memory material in configured to have a sufficiently high resistance, is often sufficient to provide the necessary heat for changing the dimension of the shape memory material.

As such, in some aspects, the actuatable member 300, comprised of a shape memory material, may further be configured as a thin strand or wire, operably engaged with the actuator device 250 and/or a fixed member associated with the actuator assembly 200. The actuator device 250 may be configured to selectively actuate the actuatable member 300 by directing an appropriate actuation signal thereto. Such an actuation signal may comprise, for example, an electrical current, though the appropriate temperature change may also be a suitable actuation signal that may be administered, for instance, by a heat source external to the actuatable member 300. The change in dimension of the actuatable member 300, in response to the actuation signal, may function in a similar manner to, for example, the retraction of the plunger in a prior art solenoid, upon actuation thereof. As such, aspects of the present disclosure may be substituted for a prior art solenoid (or wax motor, as appropriate) to perform the same function as such prior art actuator assemblies.

In some aspects, an appropriate actuation signal may comprise an electrical current from a 12 volt power source associated with the actuator device 250, particularly with the actuatable member 300 comprising a fine gauge strand or wire. In such instances, the electrical current draw with respect to the actuatable member 300 may be significantly less compared to the electrical current required to actuate, and maintain the actuation of, a prior art solenoid. As such, advantages may be realized, for example, as decreased power consumption compared to prior art solenoids. Further, since the deflection (i.e., change in dimension) of the actuatable member 300 is a gradual process (i.e., in proportion to the heat generated by the actuation signal), rather than through an rapid motion as with a prior art solenoid, there may be no audible sound associated with the actuation of an actuator assembly 200 implementing an actuatable member 300 comprising a shape memory material, according to aspects of the present disclosure. As such, additional advantages may be realized, for example, as decreased operational noise compared to prior art solenoids. In addition, some prior art solenoids may require significant windings for generating the necessary magnetic field for actuation of the actuatable member 300. Typically, such windings may be comprised of copper, which may be relatively expensive. As such, additional advantages may be realized, for example, as decreased manufacturing and/or component cost compared to prior art solenoids, since aspects of the present disclosure require less or otherwise eliminate the requirements for copper windings.

Figure 2C:
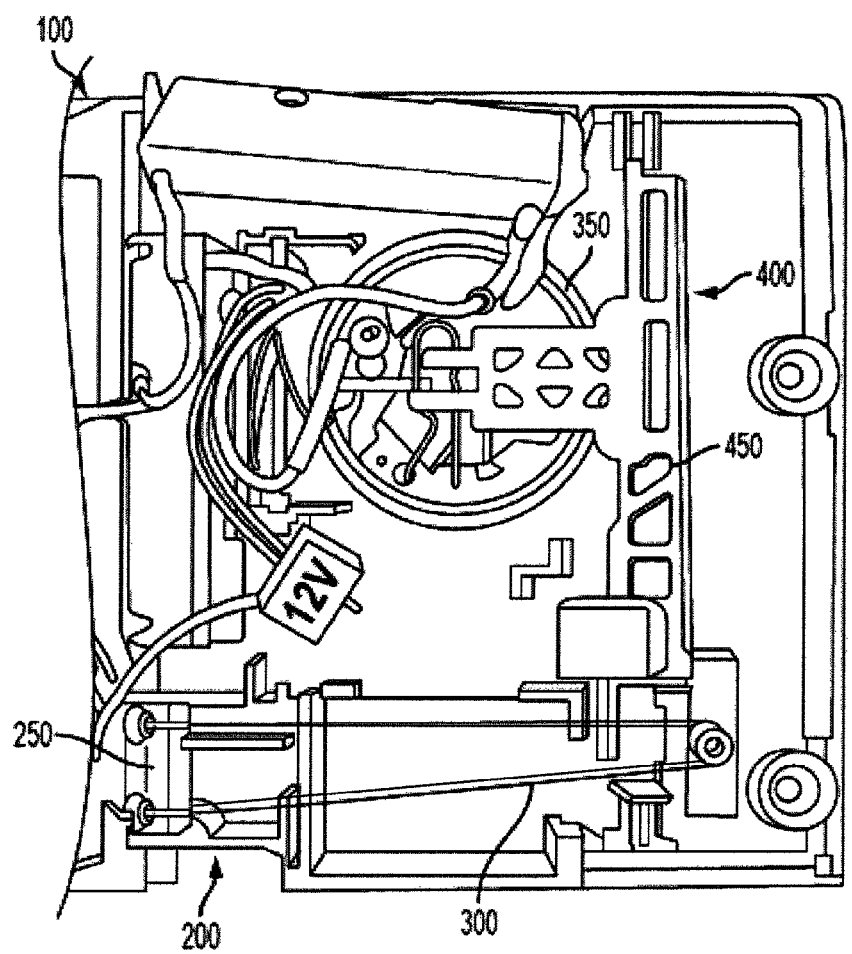
FIG. 2C illustrates an actuatable apparatus comprising a fan damper, according to one aspect of the present disclosure.
Figure 4C:
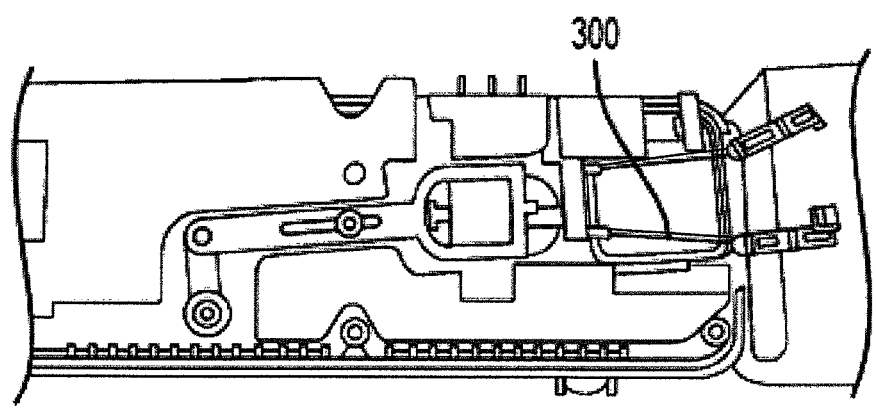
FIG. 4C illustrates an actuatable apparatus comprising a detergent dispenser, according to one aspect of the present disclosure.

In some aspects, the actuatable member 300 comprising a shape memory material, may comprise a continuous fine gauge strand or wire operably engaged with the actuator device 250 (or a fixed member associated with the actuator assembly 200) and extending therefrom into communication with the movable member 350. Such an actuatable member 300, in some instances, may be a single strand/wire extending between the actuator device 250/fixed member and the movable member 350. In other instances, the continuous strand/wire may extend multiple times between the actuator device 250/fixed member and the movable member 350. In still other instances, a plurality of strands/wires may extend between the actuator device 250/fixed member and the movable member 350. For example, FIGS. 2C and 4C illustrate actuatable member 300 with a plurality of wires. One result of the latter two configurations may be, for example, to amplify the force imparted to the movable member 350 via the actuatable member 300.

Figure 3:
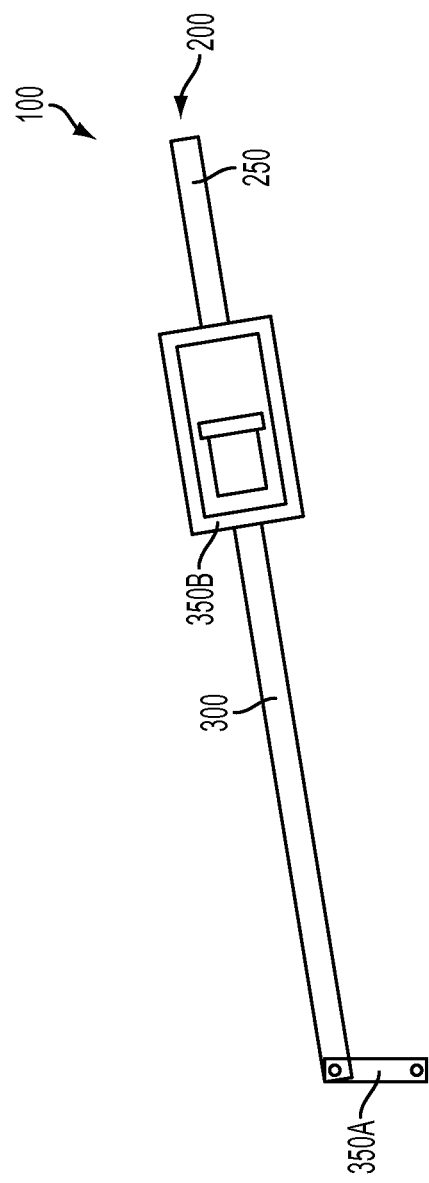
FIGS. 3 and 4A illustrate examples of an actuatable apparatus comprising a detergent dispenser, according to another aspect of the present disclosure.
Figure 4B:
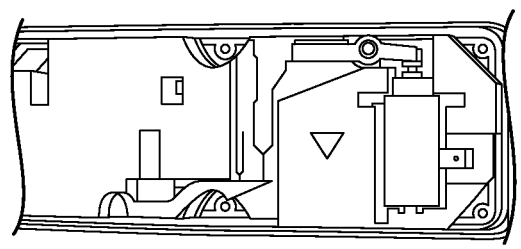
FIG. 4B illustrates a prior art actuatable apparatus comprising a detergent dispenser.
Figure 4A:
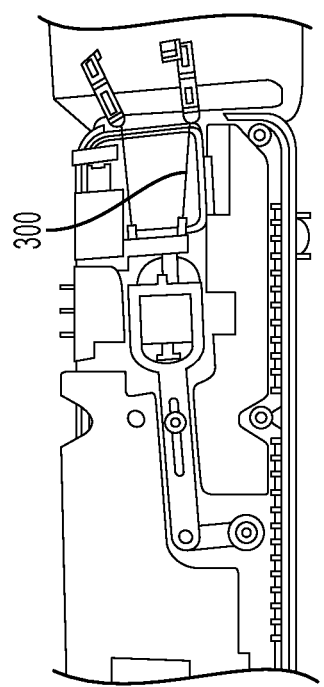
Figure 5:
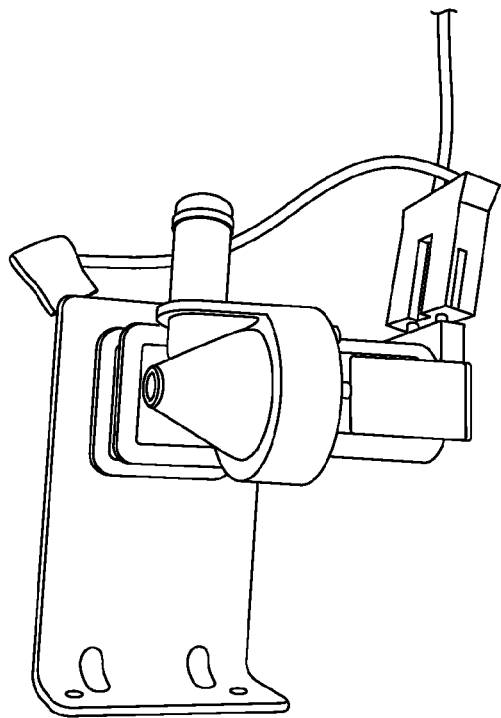
FIG. 5 illustrates a prior art actuatable apparatus comprising a water valve.
Figure 6:
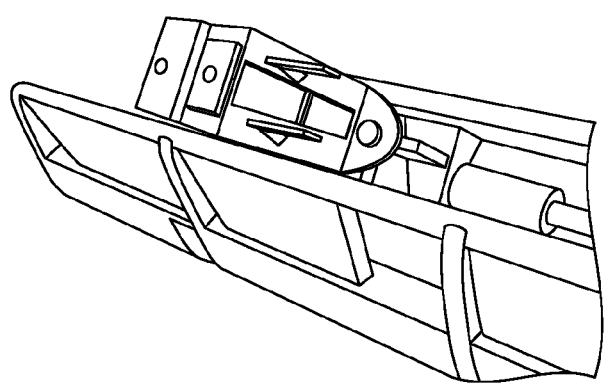
FIG. 6 illustrates a prior art actuatable apparatus comprising a vent device.
Figure 7:
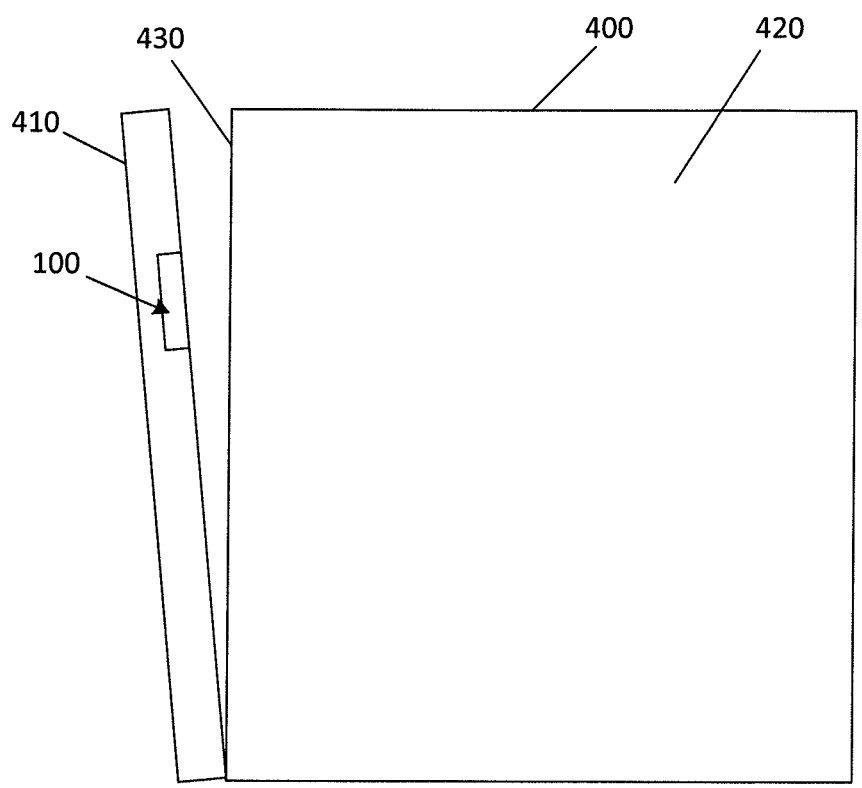
FIG. 7 illustrates a dishwashing appliance according to one aspect of the present disclosure.

As previously discussed, some dishwashing appliances may include more than one operational component implementing or otherwise requiring linear actuation, wherein such linear actuation may be provided by an appropriate magnetic solenoid and/or a wax motor. Such operational components may include, for example, the actuatable fan damper, an actuatable water valve, an actuatable detergent dispenser, and an actuatable vent device. However, the use of multiple linear actuators, whether magnetic solenoids or wax motors, may undesirably add, for example, cost, higher power consumption, unreliability, and noise to the dishwasher itself. As such, as illustrated in FIGS. 3 and 4A, aspects of an actuator assembly 200 employing an actuatable member 300 comprised of a shape memory material, as disclosed herein, may also be applied to, for example, a detergent dispenser of a dishwashing appliance. As shown, the actuator assembly 200 may be in communication with both a door 350A and a pump mechanism 350B (each comprising a movable member 350), via the actuatable member 300. In such instances, actuation of the actuatable member 300 via the actuation signal causes the door 350A of the detergent dispenser to be opened. Actuation of the actuatable member 300 may also actuate the pump mechanism 350B to dispense, for instance, a detergent or rinse aid through the door 350A and into the tub of the dishwashing appliance. In this regard, FIG. 4B illustrates a prior art actuator assembly in a detergent dispenser for a dishwashing appliance, comprising a wax motor. FIG. 7 illustrates one embodiment of a dishwashing appliance 400 including an actuatable apparatus 100 associated with a door assembly 410, which may be used in connection with a detergent dispenser. FIG. 7 also illustrates that the dishwashing appliance 400 includes a tub portion 420 defining a forward access opening 430, wherein the door assembly 410 is configured to cooperate with the tub portion to cover the forward access opening. FIG. 6 similarly illustrates a prior art vent device, such as an active vent device, also employing a wax motor. FIG. 5 illustrates a prior art water valve, employing a solenoid. In these instances, based on the foregoing, one skilled in the art will appreciate that such operational components implementing a wax motor or solenoid may also be appropriately configured such the wax motor or solenoid is replaced by an actuator assembly 200 employing an actuatable member 300 comprised of a shape memory material, as otherwise disclosed herein within the scope of the present disclosure.

Aspects of the present disclosure may thus provide advantages over prior art actuation assemblies, including reduced component and/or manufacturing costs, reduced energy consumption, and reduced operational noise. In one instances, replacement of a solenoid associated with a prior art water valve, with an actuator assembly 200 according to aspects of the present disclosure, may reduce or eliminate a "water hammer" effect within the water valve that may be caused by the rapid movement and action of the solenoid upon actuation thereof. Further, since aspects of the present disclosure involve relatively low voltage (i.e., 12 volts) components, other advantages may be realized, for example, in providing a "low voltage" assembly (i.e., a low voltage door assembly for a dishwashing appliance). Such "low voltage" assemblies may be, for instance, relatively safer than higher voltage (i.e., 120 VAC) assemblies, and be more cost effective in relation to safety verifications and/or certifications often associated with electrically-operated appliances.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An actuatable apparatus for a dishwashing appliance, comprising:
    a plurality of movable members each configured to be movable between a first position and a second position;
    an actuator device configured to selectively provide an actuation signal; and
    an actuatable member operably engaged with at least one fixed member and extending therefrom into communication with each of the movable members, the actuatable member being configured to receive the actuation signal, and to change in dimension in response thereto, so as to provide a linear force for moving the movable members, with respect to the at least one fixed member, between the first and second positions.

2. An actuatable apparatus according to claim 1, wherein the actuatable member comprises a shape memory material.

3. An actuatable apparatus according to claim 2, wherein the shape memory material comprises a nickel-titanium alloy.

4. An actuatable apparatus according to claim 1, wherein the actuation signal comprises one of an electrical current and a temperature change.

5. An actuatable apparatus according to claim 1, wherein the actuatable member is configured as a strand of a shape memory material.

6. An actuatable apparatus according to claim 5, wherein the strand is continuous and is configured to extend multiple times between the fixed member and the movable members so as to amplify the linear force therebetween.

7. An actuatable apparatus according to claim 5, wherein the actuatable member comprises a plurality of strands each configured to extend between the fixed member and the movable members so as to amplify the linear force therebetween.

8. A dishwashing appliance, comprising:
    a tub portion defining a forward access opening;
    a door assembly pivotably engaged with the tub portion and movable between an open position and a closed position, the door assembly in the closed position cooperating with the tub portion to cover the forward access opening, the door assembly defining an upper end opposed to a lower end with respect to the forward access opening; and
    at least one actuatable apparatus associated with one of the tub portion and the door assembly, each actuatable apparatus comprising:
        a movable member configured to be movable between a first position and a second position;
        an actuator device configured to selectively provide an actuation signal; and
        an actuatable member operably engaged with a plurality of fixed members and extending therefrom into communication with the movable member, a distance between the fixed members being less than a distance between each of the fixed members and the movable member, the actuatable member being configured to receive the actuation signal, and to change in dimension in response thereto, so as to provide a linear force for moving the movable member, with respect to the fixed members, between the first and second positions.

9. A dishwashing appliance according to claim 8, wherein the actuatable member comprises a shape memory material.

10. A dishwashing appliance according to claim 9, wherein the shape memory material comprises a nickel-titanium alloy.

11. A dishwashing appliance according to claim 8, wherein the actuation signal comprises one of an electrical current and a temperature change.

12. A dishwashing appliance according to claim 8, wherein the actuatable member is configured as a strand of a shape memory material.

13. A dishwashing appliance according to claim 12, wherein the strand is continuous and is configured to extend multiple times between the fixed members and the movable member so as to amplify the linear force therebetween.

14. A dishwashing appliance according to claim 12, wherein the actuatable member comprises a plurality of strands each configured to extend between the fixed members and the movable member so as to amplify the linear force therebetween.

15. A dishwashing appliance according to claim 8, wherein the at least one actuatable apparatus is selected from the group consisting of an actuatable fan damper, an actuatable water valve, an actuatable detergent dispenser, and an actuatable vent device.

16. A dishwashing appliance according to claim 8, wherein the at least one actuatable apparatus is an actuatable fan damper.

17. A dishwashing appliance according to claim 8, wherein the at least one actuatable apparatus is an actuatable water valve.

\* \* \* \* \*